United States Patent [19]

Plante

[11] Patent Number: 4,842,742

[45] Date of Patent: Jun. 27, 1989

[54] METHOD FOR FORMING LARGE OBJECTS SUCH AS REFRIGERATOR LINERS FROM CRYSTALLINE SYNTHETIC RESINS

[75] Inventor: Robert F. Plante, St. Joseph, Mich.

[73] Assignee: Whirlpool Corporation, Benton Harbor, Mich.

[21] Appl. No.: 899,826

[22] Filed: Aug. 25, 1986

[51] Int. Cl.[4] .............................................. B29C 43/02
[52] U.S. Cl. .................................... 264/522; 264/549; 264/550
[58] Field of Search .................. 264/292, 322, 331.17, 264/522, 550, 553, 571, 549

[56] References Cited

U.S. PATENT DOCUMENTS

| | | | |
|---|---|---|---|
| 2,852,328 | 9/1958 | Jewell et al. | 264/571 |
| 2,973,558 | 3/1961 | Stratton, Jr. | 18/56 |
| 3,235,639 | 2/1966 | Knowles | 264/92 |
| 3,400,111 | 9/1968 | Schwartz | 264/89 |
| 3,499,188 | 3/1970 | Johnson | 18/19 |
| 3,502,310 | 3/1970 | Coffman | 263/6 |
| 3,532,786 | 10/1970 | Coffman | 264/292 |
| 3,546,746 | 12/1970 | Johnson | 18/19 |
| 3,606,958 | 9/1971 | Coffman | 220/63 |
| 3,642,415 | 2/1972 | Johnson | 18/19 F |
| 3,757,718 | 9/1973 | Johnson | 113/120 R |
| 3,858,409 | 1/1975 | Besing | 62/285 |
| 3,929,953 | 12/1975 | Van Der Gaag et al. | 264/94 |
| 4,030,870 | 6/1977 | Bunce | 264/553 |
| 4,282,277 | 8/1981 | Austen et al. | 264/570 |
| 4,420,454 | 12/1983 | Kawaguchi et al. | 264/512 |
| 4,619,806 | 10/1986 | Gunn | 264/522 |

FOREIGN PATENT DOCUMENTS

| | | | |
|---|---|---|---|
| 56-113417 | 9/1981 | Japan | 264/553 |
| 58-98218 | 6/1983 | Japan | 264/553 |
| 60-49921 | 3/1985 | Japan | 264/553 |

OTHER PUBLICATIONS

*Solid Phase Forming of Thermoplastics,* by Herbert Johnson, David Roylance and Richard Desper, pp. 371-380, of proceedings of 4th National Sampe Technical Conference & Exhibition, Oct. 17-19, 1972.
"Solid Phase Stretch Forming" (SPSF), publ'd by Shell Oil Company.
Article "Solid Phase Processes" in Jan. 1978 Plastics World.
Article "Solid Phase Pressure Forming", P. R. Kelly and W. C. Burns, 1978-1979 issue of *Modern Plastics Encyclopedia,* p. 396, publd. by McGraw-Hill & Co., Inc.
Paper of P. M. Coffman, entitled "Solid-Phase Forming as a Production Method", presented at 1st National Conference on Profit from Science, Apr. 30-May 1, 1970.
Coffman, "Stretch Forming Polypropylene Sheet," *Appliance Manufacturer,* May 1978, p. 56 & 57.

Primary Examiner—Peter Hruskoci
Attorney, Agent, or Firm—Wood, Dalton, Phillips, Mason & Rowe

[57] ABSTRACT

A method of forming relatively large objects, such as refrigerator liners, by a solid phase forming process from crystalline-type synthetic resins, such as polypropylene. The invention comprehends utilization of stretch forming, vacuum forming, and pressure forming techniques in combination with controlled heating of different portions of the billet to provide desired differential thicknesses in different portions of the liner. The invention further comprehends the provision of the liner with biaxial molecular orientation in portions thereof subject to shock impact forces.

24 Claims, 7 Drawing Sheets

METHOD FOR FORMING LARGE OBJECTS SUCH AS REFRIGERATOR LINERS FROM CRYSTALLINE SYNTHETIC RESINS

BACKGROUND OF THE INVENTION

1 Field of the Invention

This invention relates to the forming of large objects, such as refrigerator cabinet liners, from crystalline synthetic resin, such as polypropylene.

2 Description of the Background Art

It has been long conventional to form large objects, such as refrigerator liners and the like, from formable synthetic resins, such as ABS plastic. The need for drawing the sheet material deeply to form the desired refrigerator liner configuration has precluded the use heretofore of crystalline synthetic resins for such large objects. It has long been known to form small objects from crystalline synthetic resins, such as polypropylene, but it has heretofore not been possible to form large objects from such materials while retaining the necessary control over shape and wall thickness as is required for refrigerator liners and the like.

It has been found that crystalline synthetic resins have limited hot strength at thermoforming temperatures, at which the resin is no longer crystalline. Thus, attempts to utilize the processes conventionally used in forming refrigerator liners from ABS sheet stock have been found to be totally impractical for use in forming large deep drawn parts from polypropylene sheet stock. The polypropylene was torn and pulled apart during the forming process. For a number of reasons, polypropylene is a preferred material for such refrigerator liners and the like, and it has long been a desideratum in the manufacture of refrigeration apparatus to utilize polypropylene if it could be formed in an economical and troublefree manner.

Recently, a process commonly referred to as solid phase forming has been developed as a forming technology wherein crystalline resins are carefully heated to a temperature adjacent but below the crystalline melting point of the thermoplastic resin, or polymer. In the solid phase forming methods developed to date, stretch forming has been suggested as a selected form of the solid phase forming method.

Because the resin is heated to a temperature below the crystalline melting point, this process is conventionally referred to as "solid phase forming". In carrying out the different proposed solid phase forming methods, some of the techniques employed have been generally similar to those employed in metal forming operations.

One of the problems of the conventional hot forming of thermoplastic resins has been the dissipation of the heat in setting the formed liner. A substantial advantage is obtained in the use of the solid phase forming process in that a smaller amount of heat need be removed from the formed object in completing the forming operation. This, in turn, permits increased production rates and, thus, lower cost in the manufacturing operations. As the manufacture of refrigeration apparatuses and the like is highly competitive, such reduced costs are a substantial consideration.

Because the polypropylene sheet is below the crystalline melting temperature, substantial force is required to form the sheet from the flat configuration into the deep drawn configuration of the conventional refrigerator liner and the like. In utilizing the lower temperature solid phase forming process, substantially different parameters and techniques have had to be ascertained and developed against a background in which it appeared that such solid phase forming processes were not adapted for use with large objects, but were capable of satisfactory use only with relatively small objects, such as food containers and the like.

Solid phase forming of the sheet stock may be effected by different specific techniques, such as stretch forming, pressure forming, stamping, drawing, and forging, as recognized techniques in the metal forming field. No one heretofore has been able to coordinate the different specific techniques in such a manner as to provide satisfactorily formed large objects having critical dimensions from the solid phase forming technique.

One prior method and apparatus for use in forming polypropylene is disclosed in U.S. Letters patent No. 3,546,746 of Herbert G. Johnson. As disclosed therein, the method and apparatus are adapted to effect solid phase working of plastics of the kind which can be strengthened by being worked in the solid phase. The invention of the Johnson patent is directed toward providing strengthening of the material by biaxial molecular orientation, as may be most suitable for the article produced.

Briefly, as disclosed in the Johnson patent, the method and apparatus are intended for use in making flanged hollow articles from a flat sheet. The outer edge of the blank is gripped about its periphery against a seat in an axial peripherally confined recess by a suitable clamp. An inner portion of the blank is moved axially as inventory material by a plunger moving through an annular orifice. The resulting product comprises a hollow article having a reduced thickness top flange, and a sidewall which is solid phase formed by controlled stretching thereof.

The clearance between the plunger and the sidewall of the female die defines the maximum thickness of the sidewall of the article. Means are provided for supplying to or removing fluid from one or both sides of the blank, as part of a system for controlling the flow of the material and also removing the formed article.

The Johnson patent further discloses the maintenance of a bottom portion of the molded product to form a closed bottom container with a top-strengthening rim. The rim is compressed by the clamping operation so as to cause it to be reduced in thickness from the original stock and to deliver some of the material therefrom radially inwardly to provide a thickening of the stretched portion of the product adjacent the rim. The compression of the rim causing the peripheral flow provides a biaxial orientation thereat for improved resistance to shock forces. Johnson teaches the heating of the prevailingly isotactic polypropylene to a temperature in the range from about 150° F. to just below the crystalline melting point of 335 ° F., with the preferred range being between about 300° F. and about 330° F. The patentee teaches the withdrawing of the plunger while permitting the article to remain in the female mold. Pressurized fluid is delivered through the plunger to aid in the separation and, subsequently, pressurized fluid is delivered through the female mold to assist removal of the formed article therefrom.

Prior to forming the sheet, the patentee teaches the heating of the sheet to a substantially uniform temperature not varying by more than 2° F. from the desired value across the surface of the blank. Working pressures are disclosed as being from about 100 to 500 psi, or more, and a holding time of about 1 to 15 seconds is disclosed as being sufficient to set the material and avoid springback.

Typical solid phase formed plastic articles produced by the techniques of the prior art have included containers, boxes, cases, pails, shovels, pipe flanges, valves and fittings, knobs, handles, washers, gears, pump motors, cams, pulleys, wheels and bearings, rivets, nuts, bolts, and the like. Polypropylene has been solid phase formed in forming meat, salad, and dairy tubs, portion packs, drinking cups and juice containers, and food service trays. The technique has been utilized in forming oil cans and, in one prior use, a five-gallon shipping container having a diameter of 12" and a height of 13" was so formed from the polypropylene sheet stock.

SUMMARY OF THE INVENTION

The present invention comprehends an improved method and apparatus for forming large objects, such as refrigerator cabinet liners and the like, from polypropylene, or other crystalline synthetic resin, by a novel modified solid phase forming technique.

The invention comprehends the provision of a novel method and apparatus for use in individual steps of the overall forming process, as well as in the unique combination of the steps. The resultant refrigerator liners have been found to be superior to the prior art liners, and the manufacture thereof, in accordance with the invention, is simple and economical.

The invention comprehends the forming of the refrigerator liner by a solid phase forming of the polypropylene which selectively provides biaxial orientation at portions of the liner wherein maximum impact strength is required, such as at the front portion of the bottom wall of the liner.

Maximum uniaxial orientation may be provided in the sidewalls wherein reduced impact force resistance is acceptable. The solid phase forming of the liners provides substantial uniformity in the thickness of the liner and in the peripheral flange.

The invention comprehends the forming of the liner by a hybrid forming process utilizing solid phase vacuum forming techniques, solid phase stretch forming techniques, and solid phase pressure forming techniques, in combination.

In the practice of the present invention, a punch is utilized for stretching the midportion of the blank. A substantial clearance is provided between the punch and the female mold wall.

The configuration of the punch differs from that of the final product and is preselected so as to provide optimum solid phase forming of the sheet, with the final configuration of the sheet being determined by the configuration of the female die against which the sheet is urged, in the final step of the forming operation, by high pressure fluid acting against the inner surface thereof.

A vacuum is applied to the underside of the sheet through the female die during the forming operation, whereby the forming technique includes aspects of stretcher forming, pressure forming, and vacuum forming in coordinated relationship. No one of the different techniques appears to comprise a primary technique, but a correlated utilization of each is provided for effecting the desired satisfactory forming of the relatively large object by the solid phase forming operation.

The invention comprehends the provision of a controlled, progressively increased clamping force on the peripheral portion of the blank so as to produce an improved front portion of the liner sidewall.

The clamping means is heated so as to provide an improved forming of the liner flange.

The controlled clamping of the flange portion provides improved delivery of a portion of the material to the outer portion of the liner sidewalls so as to provide improved impact strength at this area of the formed liner. The invention comprehends controlling the rate at which the flange material is thusly forced inwardly so as to provide an improved resultant high strength structure at this portion of the liner.

The invention also comprehends that the polypropylene sheet material be extruded so as to have an initial uniaxial orientation. The sheet material is then cut into suitable billets in a preselected manner so as to assure that the portions of the liner desired to have high strength are arranged to be biaxially oriented as a result of the solid phase forming of the liner from the blank, or billet.

The invention further comprehends a novel heating of the billets to a relatively uniform temperature throughout in the range of approximately 335° F., with a subsequent cooling of only the surface portion thereof to provide an improved solid phase forming thereof.

In the illustrated embodiment, the billets are heated between two heated platens of conventional construction.

In the illustrated embodiment, the clamp ring, provided for clamping the peripheral portion of the billet, is provided with sealing means for preventing escape of the high pressure air used at one portion of the forming process.

Means are provided in the female die to vent the air trap below the sheet being formed. The passage means provided for this purpose are subsequently utilized for introducing pressurized air under the formed liner to aid in removing it from the female die or mold.

Suitable heating and cooling of the male die plunger and the female die mold are effected by circulating heating and cooling fluids through suitable passages therein.

The invention provides a substantial improvement in the commercial forming of refrigerator liners and the like. The cost of the polypropylene synthetic resin is substantially less than that of the ABS material previously utilized for such liners, and the chemical resistance of the polypropylene is superior to that of the ABS resin.

The time to form each liner is substantially less than the time required in forming the ABS resin liners by the prior art conventional thermoforming processes.

A further advantage of the use of polypropylene in such refrigerator liners is the minimizing or elimination of the need for a foam-release agent on the liner inner surface, which has been required where ABS resin liners are utilized.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figures 1, 2, 2A:
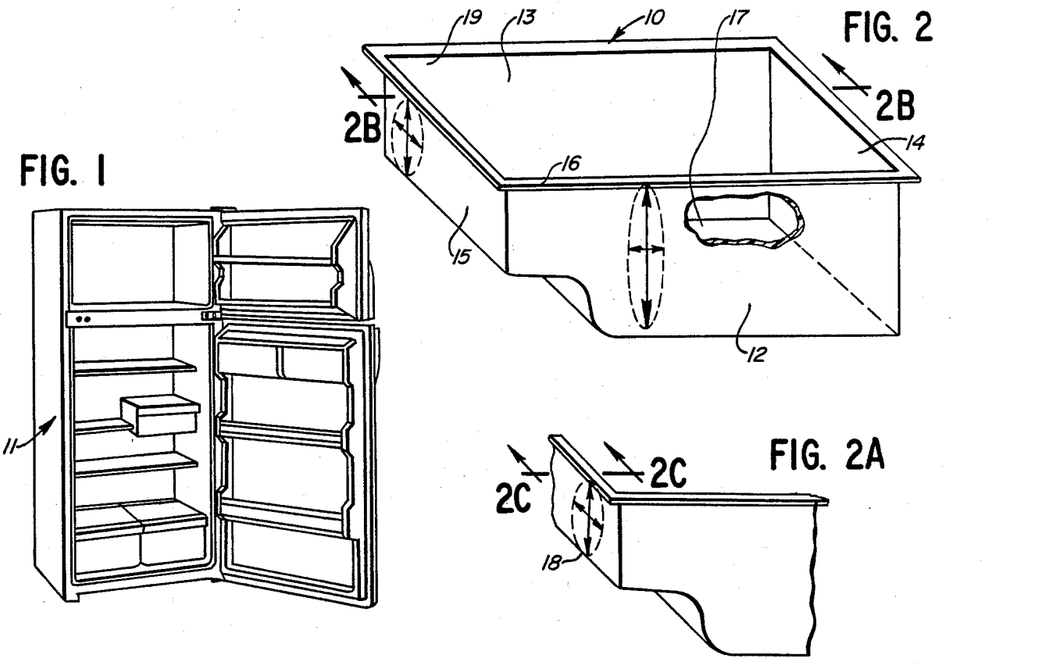
FIG. 1 is a perspective view of a refrigerator/freezer having a liner formed by method and apparatus embodying the invention.
FIG. 2 is a perspective view of the liner illustrating the general molecular orientation of different portions thereof, including a desired optimum orientation in the bottom wall portion of the liner.
FIG. 2A is a fragmentary perspective view illustrating a practical biaxial orientation in the bottom wall of the liner as provided by the solid phase forming thereof in the present invention.

In the illustrative embodiment of the invention as disclosed in the drawings, a refrigerator liner generally designated 10 is shown to comprise a liner for use in a refrigeration apparatus generally designated 11 comprising, as seen in FIG. 1, a refrigerator/freezer apparatus.

As seen in FIG. 2, the liner defines sidewalls 12 and 13, a top wall 14, and a bottom wall 15. The liner further defines a peripheral outturned flange 16 and a rear wall 17.

The present invention is concerned with the forming of such a liner of a crystalline synthetic resin, such as polypropylene, by means of a solid phase forming process providing unique desirable characteristics of the liner in a novel and economical manner.

An important feature of the invention is the provision of the bottom wall 15 of the liner with a generally biaxial molecular orientation generally designated 18, as illustrated in FIG. 2A, thus providing maximum impact strength. The bottom wall of the liner is most likely to be subject to recurrent impacts, as by the user of the refrigerator dropping articles thereonto in the use of the refrigerator, and it is most desirable to maintain the highest impact strength of the liner in this portion thereof. It has been found that by causing the molecular orientation of the bottom wall 15 to be biaxial, as illustrated in FIG. 2A, maximum impact strength characteristics are provided in this portion of the liner.

As further illustrated in FIG. 2, the sidewalls 12 and 13 of the liner may have increased uniaxial orientation, which, while providing lower impact strength, has been found to be sufficient for accommodating the forces normally to which the sidewalls of the refrigerator liner are subjected in use.

It is further desirable to provide an improved-strength flange 16 and the present invention comprehends the unique method of forming the flange during the solid phase forming operation to provide high strength and uniformity in thickness with improved strength in the portion 19 of the liner adjacent the flange 16 extending about the periphery of the liner.

Figures 2B, 2C, 3:
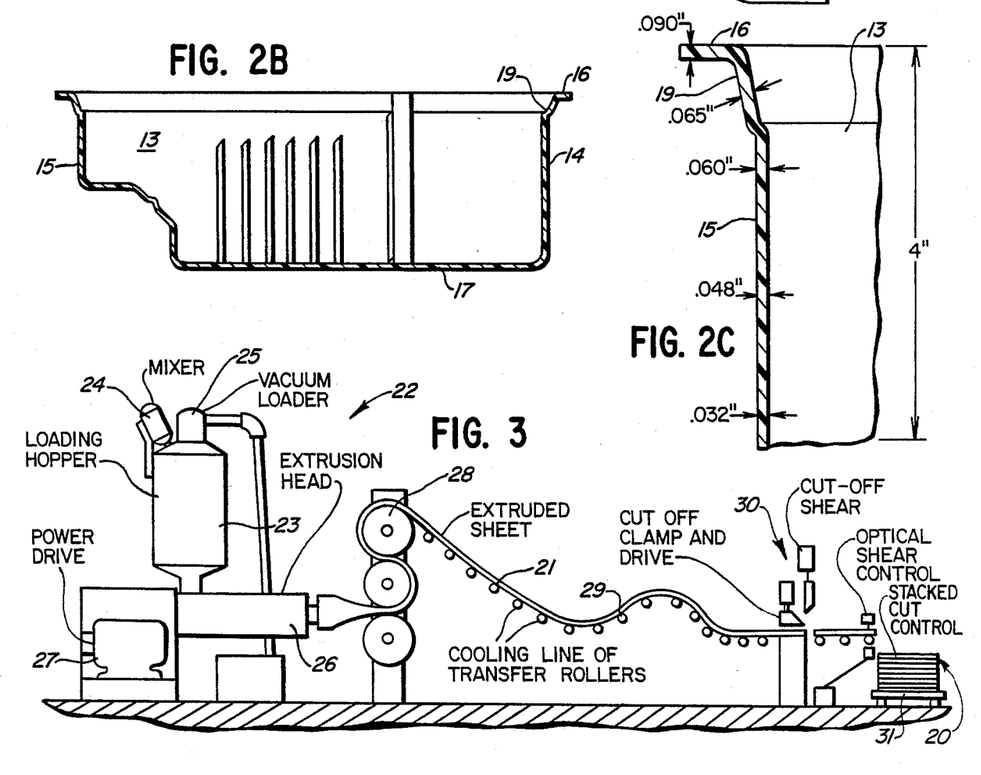
FIG. 2B is a fragmentary longitudinal section of the liner taken substantially along the line 2b—2b of FIG. 2.
FIG. 2C is a fragmentary enlarged vertical section of the bottom wall portion of the liner illustrating the construction thereof in greater detail.
FIG. 3 is a side elevation of apparatus for providing the selectively oriented polypropylene sheet stock billets for use in practicing the invention.

A preferred configuration of liner formed by the process of the present invention is illustrated in FIG. 2C wherein it may be seen that the liner has a decreasing thickness from the flange 16 inwardly along the bottom wall 15.

As discussed briefly above, the invention comprehends forming liner 10 of a crystalline synthetic resin, or polymer, such as polypropylene, by a novel solid phase forming process. The forming of the relatively deeply concave large liner heretofore has not been found feasible by the solid phase forming processes of the prior art. The present invention comprehends an improved solid phase forming process advantageously adapted for producing refrigerator liners and the like in commercial production and at relatively high speed and low cost.

The invention comprehends the provision of the billets 20 from which the individual liners are formed from an extruded sheet 21 of polypropylene. As illustrated in FIG. 3, the sheet forming apparatus may comprise a conventional extruding apparatus generally designated 22, which may include a suitable supply hopper 23, a mixer 24, a vacuum loader 25, and a conventional extrusion head 26, with a suitable power drive 27 associated with the apparatus.

The sheet is extruded from the head 26 to suitable rolls 28 and then along suitable cooling transfer rollers 29 to a cutoff device generally designated 30 wherein the sheet is cut into the desired billets 20 and suitably stacked on pallet 31.

Figure 4:
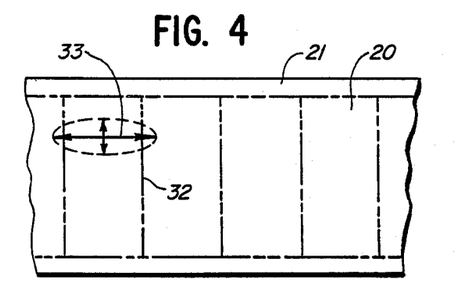
FIG. 4 is a schematic plan view of the polypropylene web illustrating a method of cutting of the billets therefrom to provide the desired biaxial orientation of the bottom wall portion of the liner as a result of the forming process.
Figure 4A:
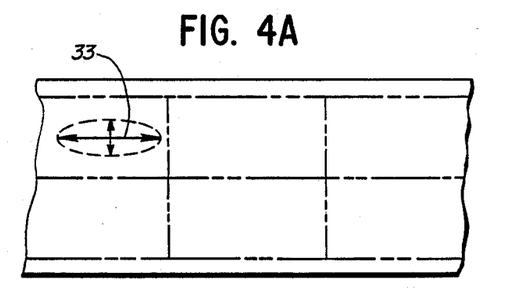
FIG. 4A illustrates another form of cutting of the web which produces an undesirable, extremely high uniaxial orientation in the bottom wall portion of the liner as a result of the solid phase forming process hereof.

As seen in FIG. 4, the extruded sheet is cut along cut lines 32 extending transversely to the sheet 21 so as to define the elongated direction of the liner billet in the transverse direction of the sheet. As a result of the extrusion process, the molecular orientation 33 of the polypropylene in the sheet is predominantly in the longitudinal direction of the extruded sheet; however, due to the manner in which the liner billets are cut, the maximum molecular orientation is transverse to the elongated direction of the billet. As illustrated in FIG. 4A, if the sheet were to be cut so as to have the billets extending lengthwise parallel to the direction of delivery of the sheet, the maximum molecular orientation 33 would extend in the lengthwise direction of the sheet and, as brought out subsequently, such orientation would be highly undesirable in the forming of the liner.

Figure 5:
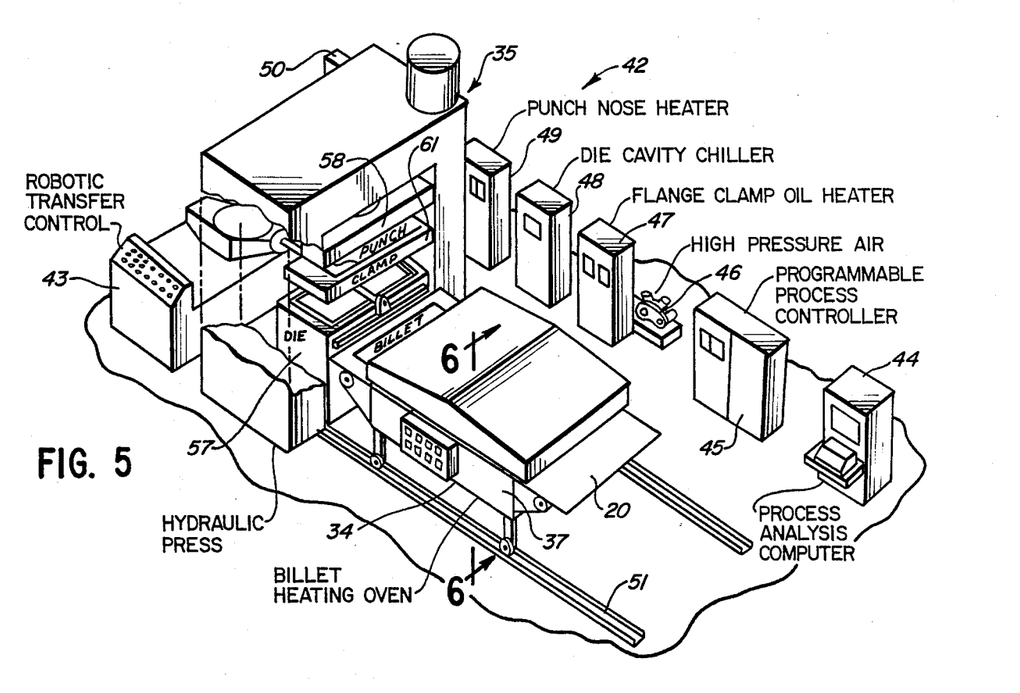
FIG. 5 is a fragmentary perspective view of the apparatus provided for heating the cut billets and solid phase forming of the heated billets.
Figure 6:
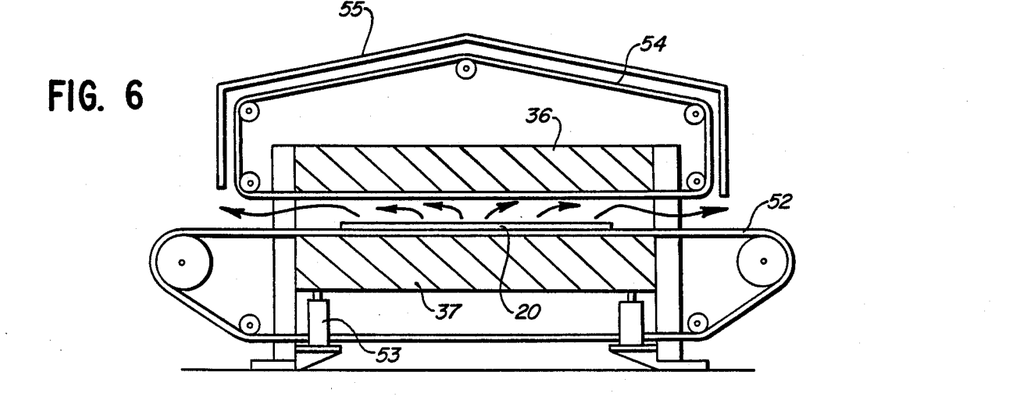
FIG. 6 is a fragmentary enlarged vertical section taken substantially along the line 6—6 of FIG. 5.
Figure 7:
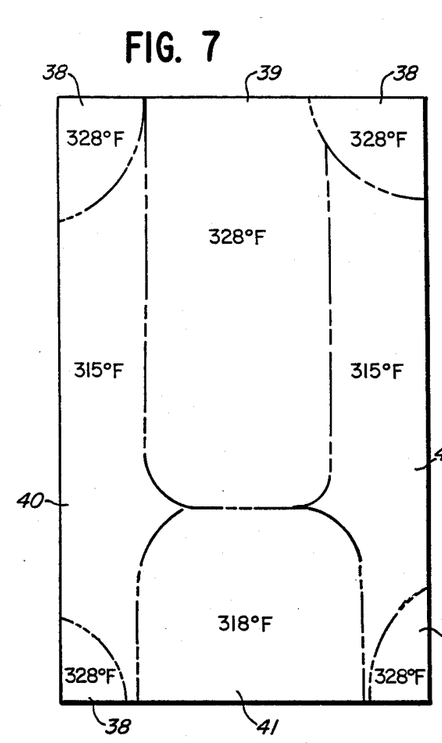
FIG. 7 is a plan view illustrating the preferred nonuniform heating of the sheet in the billet heating oven.

Referring now to FIGS. 5 and 6, the billet 20 is delivered to a billet heating oven 34 prior to delivery thereof to the forming station generally designed 35. The oven includes an upper heating platen 36 and a lower heating platen 37 arranged to heat the billet to a generally uniform but differentially localized temperatures in the range of approximately 315° F. to 328° F. Specifically, as seen in FIG. 7, the corner portions 38 of the billet are heated to a temperature of approximately 328° F. as is a long longitudinally extending midportion 39 thereof. The sides 40 of the billet between the opposite end corners 38 are heated to a lower temperature of approximately 315°, and the short remaining midportion 41 of the billet extending from portion 39 is heated to an intermediate temperature of approximately 318° F.

The invention comprehends that the billet be allowed to cool for a short time, such as 5 seconds, prior to delivery to the forming station. Such cooling may be effected by withdrawing the billet from between the retracted and spaced platens before transferring the billet to the forming station. A suitable heating oven 34 is illustrated in FIG. 5 in conjunction with the forming station 35. By way of example, heating ovens of the type disclosed in U.S. Pat. No. 4,431,404, assigned to the assignee hereof, or of the type disclosed in U.S. Pat. Nos. 3,502,310 or 3,684,258, can be used to practice the present invention.

The manufacturing line generally designated 42 may include a robotic billet transfer control 43 for coordinating the delivery of the billet and operation of the forming station. In one illustrative forming line, the apparatus further included a process analysis computer 44, a programmable process controller 45, a source of high pressure air 46, a flange clamp oil heater 47, a die cavity chiller 48, punch nose oil heater 49, and a vacuum pump 50. As shown in FIG. 5, the oven may be mounted on suitable tracks 51.

As seen in FIG. 6, the billet 20 is heated between the upper platen 36 and lower platen 37, while retained therebetween on a continuous transfer belt 52. Suitable means 53 may be provided for vertically positioning the lower platen 37, as desired. An upper free-running belt 54 is provided for passing the billet 20 under the upper platen 36. A cover 55 may be provided overlying the oven.

Brief cooling of the heated billet causes a selective and restricted cooling of the skin and edge portions of the billet slightly below the indicated temperatures, and has been found to provide an improved liner construction by the solid phase forming process.

Figure 9:
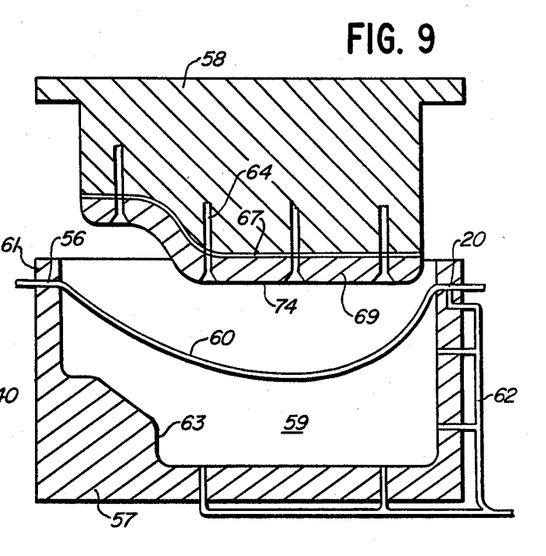
FIG. 9 is a fragmentary vertical section illustrating an initial step in the solid phase forming operation wherein a vacuum is applied to the underside of the sheet prior to the engagement of the male die plunger with the upper surface thereof and subsequent to the clamping of the peripheral portion of the sheet by the clamp ring against the mating female die portion.

Referring now to FIG. 9, the heated billet 20 is placed in the forming station, with the periphery thereof resting on the upper edge surface 56 of a lower female die 57. The male die, or plunger, 58 is centered above the cavity 59 of the female die and is maintained spaced above the upper surface 60 of the billet until such time as a holding clamp ring 61 is urged hydraulically downwardly against the upper surface 60 of the peripheral portion of the billet to clamp it against female die surface 56.

Figure 12A:
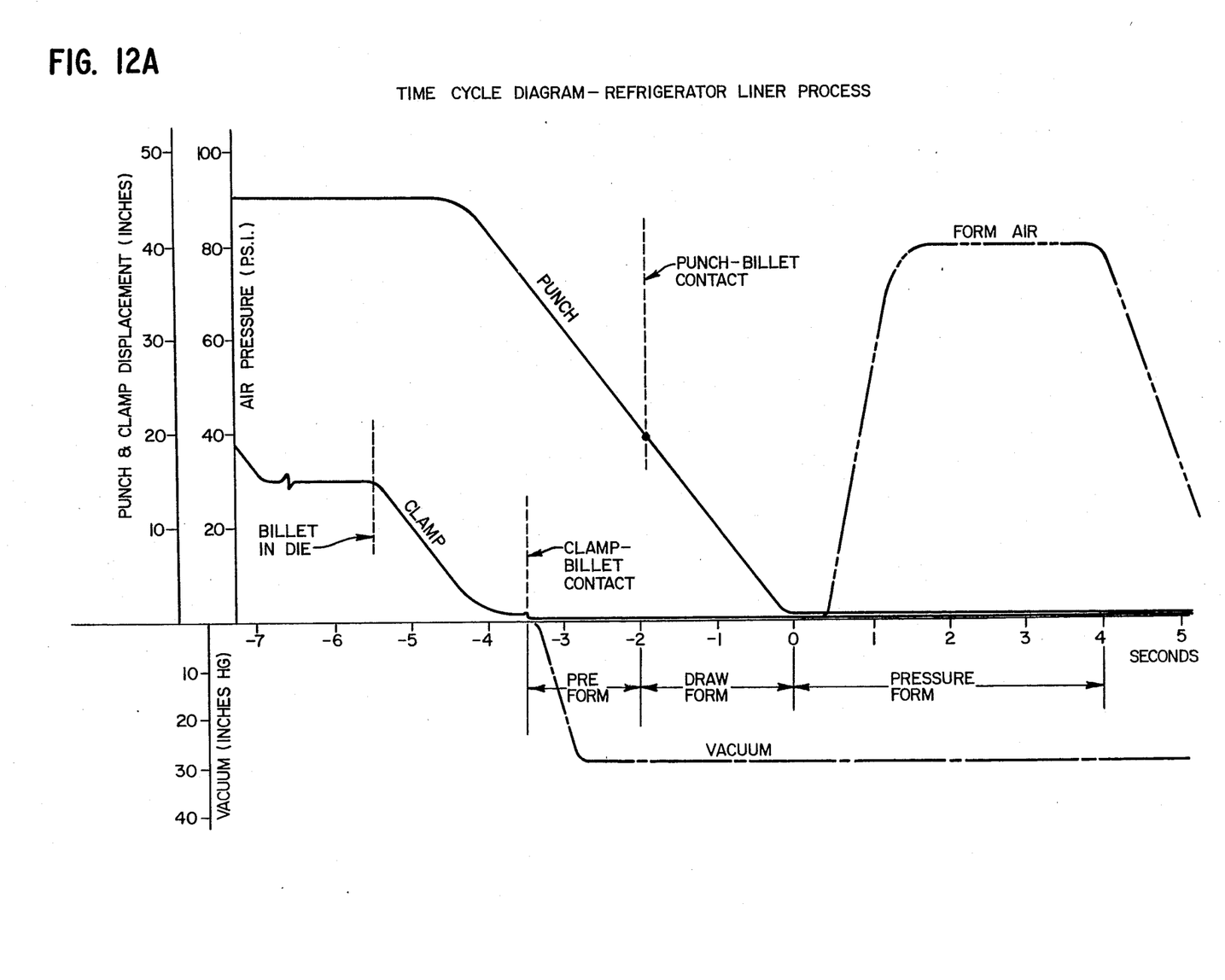
FIGS. 12A and 12B are time cycle diagrams illustrating schematically the different steps in the solid phase forming operation.

Referring now to FIG. 12A, the holding clamp ring is urged downwardly against the upper surface of the billet. At the time the clamp engages the billet surface, a vacuum is applied to the underside of the billet through vacuum lines 62 and concurrently to the female die space 59 subjacent the center portion of the billet extending thereacross. As shown in FIG. 9, this draws the center portion of the billet downwardly away from the punch 58 such that the center billet portion extends approximately half way into the female die 57. This step of the process has been found to be important in achieving the desired uniformity of thickness in the side and back walls of the formed liner.

As shown in FIG. 12A, downward movement of the punch 58 is initiated slightly after downward movement of the clamp ring is initiated. Well before the punch contacts the billet, the clamp ring contacts the upper surface of the periphery of the billet to create a vacuum seal and commence compression of the peripheral portion of the billet. Approximately 1½ seconds later, the punch, in its descent, contacts the upper surface of the billet and commences a downward stretch forming of the billet while the peripheral portion thereof remains clamped, having just undergone a progressive clamp squeezing thereof. As shown in FIG. 12A, the vacuum is applied at approximately 3½ seconds before the billet reaches its furthermost downward movement, slightly after the clamp contacts the billet upper surface. The forming of the billet downwardly by the plunger, or punch, is assisted by the vacuum in the lower space 59.

As indicated briefly above, as the pressure applied to the peripheral portion of the billet is increased by progressively increasing the force of the clamp ring thereagainst, so that a portion of the material thereof tends to flow inwardly to the outer, or forward, portion 19 of the sidewall of the liner being formed.

As further shown in FIG. 12A, the downward movement of the male punch continues to the lowermost position at an indicated time zero.

Final forming of the billet against the female die surface 63 is effected by the provision of pressurized air through passages 64 in the male punch 58 so that the final forming of the sheet material is effected by a pressure forming step aided by the removal of trapped air from below the sheet by the vacuum passages 62 opening into the cavity 59.

Thus, the configuration of the male die member need not accurately conform to the configuration of the female die surface 63 as the actual final forming of the liner configuration is effected by the air pressure forming step.

Figure 8:
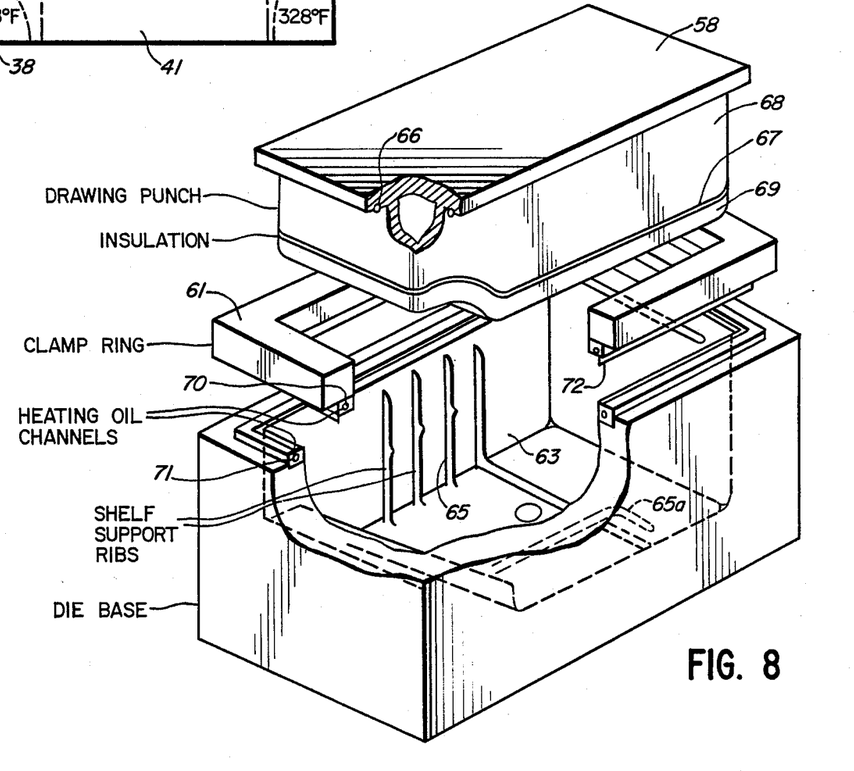
FIG. 8 is a fragmentary perspective view illustrating the cooperative association of the plunger, the clamp ring, and the female die mold.

As shown in FIG. 8, the female molding surface 63 may be provided with suitable protrusions, such as ribs 65, to form shelf supports or other desired details in the sidewalls of the refrigerator liner. Similarly, a suction line trench 65a may be provided as a recess in the female die surface 63.

As further illustrated in FIG. 8, the male die member 58 may be provided with a sealing ring 66 for forming an air seal between the male die member 58 and the clamp ring 61. Insulation 67 may be provided between the upper portion 68 and the lowermost portion 69 defining the nose of the male die member, as shown in FIG. 8.

The clamp ring 61 is heated by flowing suitable heated oil through a passage 70 therein and the upper edge portion of the female die member subjacent surface 56 may be heated by a similar heating oil passage 71 therein.

For improved gripping of the peripheral portion of the billet, the upper surface 56 of the female die member may be serrated. As seen in FIG. 8, a seal ring 72 may be provided on the clamp ring to provide a seal against loss of pressurized air between the clamp ring and the upper surface 60 of the billet when the high pressure air is delivered through the passages 64.

As seen in FIG. 12A, the high pressure air, identified as "form air" in this Figure, is caused to act on the upper surface 60 of the sheet to urge it firmly against the female die surface 63 for a suitable period of time to assure proper conformity of the sheet with the female die surface. The female die is preferably maintained at a temperature that is substantially below that of the heated billet, so that the formed liner will be cooled by contact with the remale die surface. Such cooling of the formed liner causes the thermoplastic material to become more solid and has been found to reduce distortion or warpage in the liner after it has been removed from the die. By way of example, the female die may be maintained at a temperature of 65 to 70° F. The high pressure air is then bled off until the pressure drops to a preselected low value, which is maintained for several seconds to aid in moving the punch back upwardly from the female die cavity and permit extraction of the formed liner therefrom.

Subsequently, the clamp ring is raised from its engagement with the peripheral portion of the billet and the passages 62 are utilized to provide pressurized air therethrough to separate the formed liner from the surfaces 56 and 63, aiding in the ejection of the liner from the female die. The liner is then removed from the die permitting a subsequent similar solid phase forming operation on the next subsequent billet.

Figure 12B:
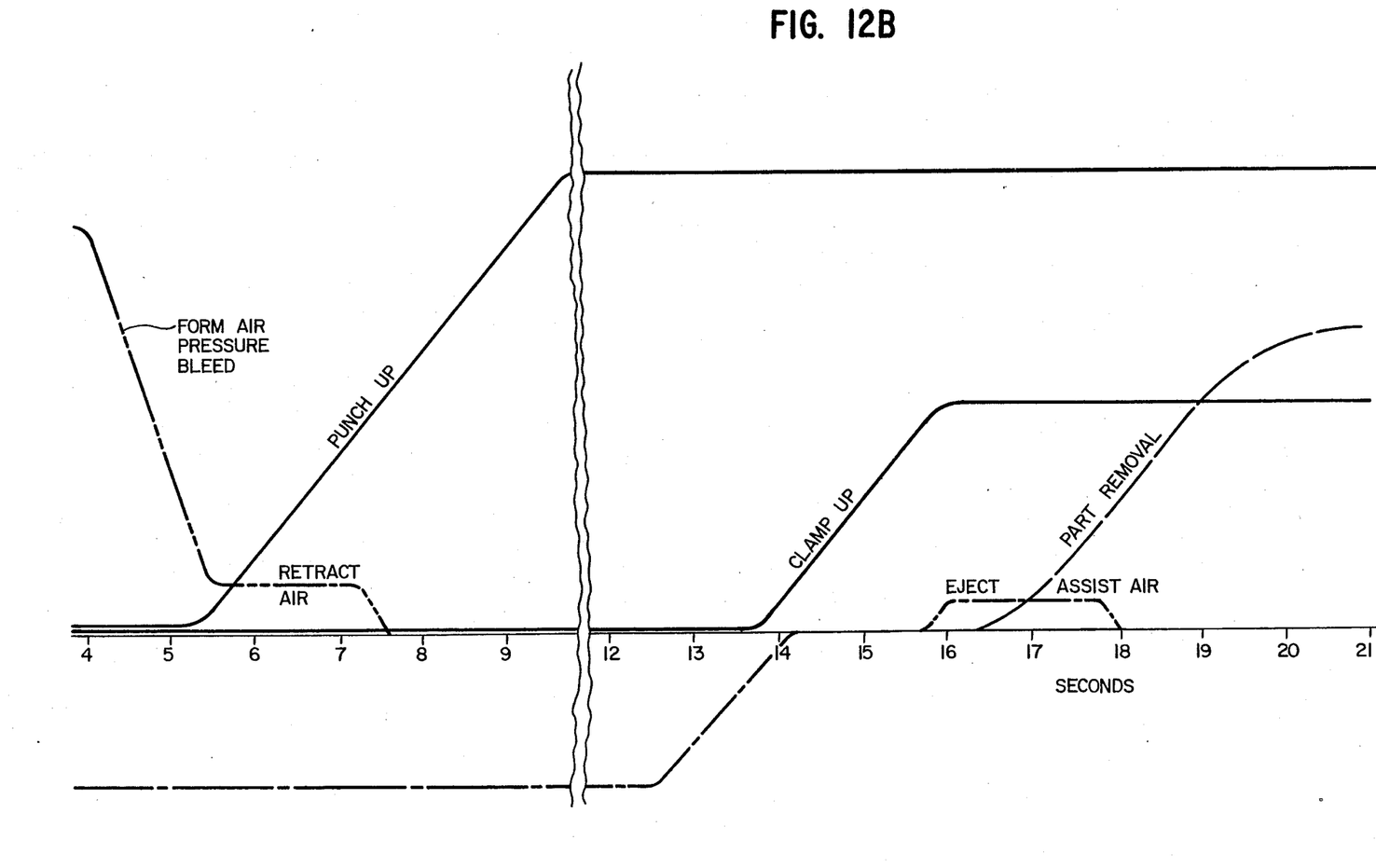

The parameters set forth in a FIGS. 12A and 12B have been found to produce superior liners in the carrying out in the forming thereof in the solid phase forming process. As will be obvious to those skilled in the art, variations from these parameters may be utilized within the broad scope of the invention.

It is believed that best results are obtained by using a nucleated polypropylene copolymer to practice the invention. By way of example, good results were obtained using a material that consisted of 47% (by weight) of Shell Chemical Company nucleated polypropylene copolymer No. 7129N, 47% calcium carbonate filler, and 6% color concentrate, such as titanium dioxide.

In one specific liner formation, a nucleated polypropylene copolymer synthetic resin was extruded into sheet stock in the manner above described. Rectangular liner billets were cut therefrom as described, and the blank was differentially heated, as indicated. The blank was allowed to dwell in the oven with the platens spaced apart for 5 seconds before being transferred to the forming station. The surface of the billet was resultingly cooled approximately 5° as a result of the approximately 1° F./sec. drop in temperature resulting from the above described opening of the oven.

The confronting clamping surfaces were heated to approximately 175° F. prior to the clamping thereof in the forming station. After clamping of the billet but before the punch contacted the billet surface, a controlled progressive squeeze of the peripheral portion of the billet was effected by hydraulically urging the clamp ring downwardly toward the female die confronting surface. This caused inward material flow to the adjacent portion of the billet within the female die.

A vacuum was applied simultaneously with the progressive clamping to draw the center portion of the billet downwardly into the die cavity.

The nose of the male die, or punch, engaged the upper surface of the billet approximately 1 to 2 seconds after the application of the vacuum, and the male die member was caused to travel downwardly at a rate of approximately 12" per second. The nose was heated to a temperature of approximately 270° F.

When the nose reached the lowermost portion of its travel, pressurized air was delivered therethrough at 80 psi gauge, and maintained at this pressure for approximately 5 seconds to pressure-form the billet against the female die surface. The female die surface was chilled to a temperature of approximately 65 to 70° F. at this time.

The total further movement of the sheet by the air pressure was approximately 1" downwardly from the nose during this phase of the solid phase forming operation.

The air pressure was then reduced to approximately 15 psi and held for several seconds before the punch was retracted and the air pressure then reduced to zero.

The vacuum on the underside of the billet in the female die cavity was released approximately 15 seconds after the high pressure forming air was applied through the male member nose.

The clamp ring was then raised and approximately 1 psi of positive air pressure was applied through the female die air passages to separate the formed liner from the mold, permitting the liner then to be mechanically removed.

The delay of the engagement of the male die member with the upper surface of the billet for several seconds after the vacuum is applied to the underside thereof appears to provide a substantial improvement in the forming of the liner in the disclosed solid phase forming process. It has been found that failure to apply this vacuum before the male die member contacts the billet makes it extremely difficult to produce the uniform material distribution necessary in providing a satisfactory refrigerator liner.

In the indicated liner formation, the billet thickness was originally approximately 0.180". As indicated in FIG. 2C, the flange 16 was progressively reduced in thickness to a thickness of approximately 0.090", and the upper portion 19 of the liner sidewalls received a portion of the flange material therefrom so as to have a thickness of approximately 0.065" in the final formed liner. The sidewall tapered downwardly from the portion 19 to the rear wall 17, as indicated in FIG. 2C, from a thickness of approximately 0.060" at the upper portion to a thickness of approximately 0.032" in the lower portion. The rear wall had a thickness of approximately 0.032". The liner so formed was 27" wide, 60" long, and 20" deep, in overall dimension.

Thus, it may be seen that the invention comprehends forming polypropylene and other crystalline synthetic resin objects of relatively large size, i.e. substantially larger than those heretofore found practical to be formed by the solid phase forming processes of the prior art. By utilizing the controlled biaxial molecular orientation discussed above, a highly impact resistant lower wall was provided in the liner, making the liner advantageously adapted for use as a refrigerator liner.

Figure 10:
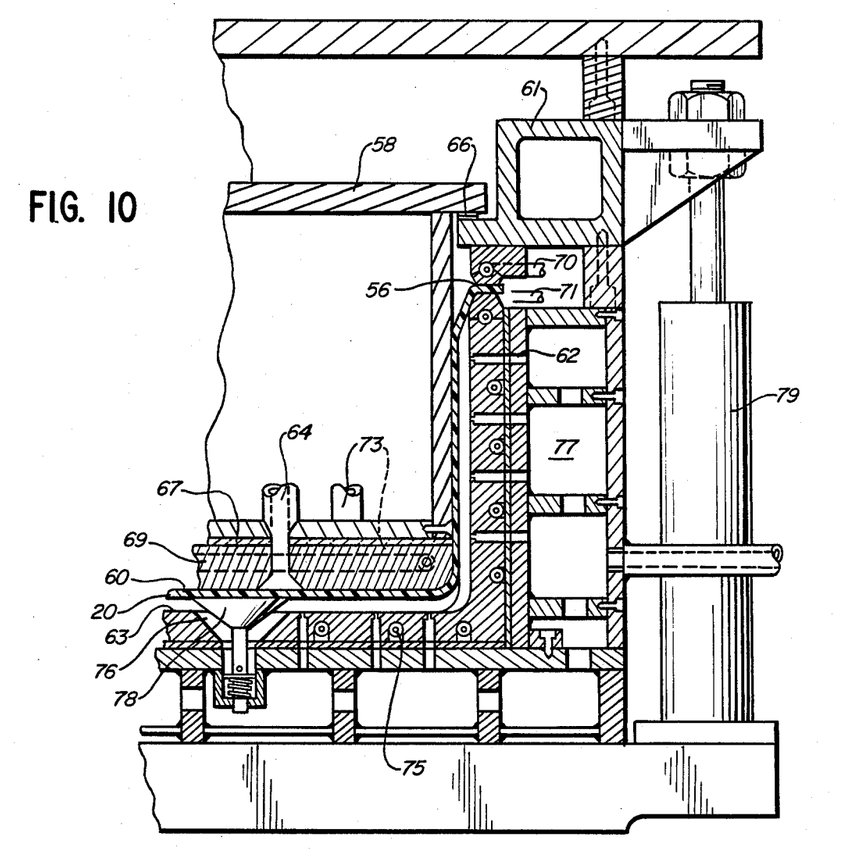
FIG. 10 is a fragmentary enlarged vertical section illustrating the provision of fluid passages for effecting heating and cooling of different portions of the male and female dies and the clamp ring.
Figure 11:
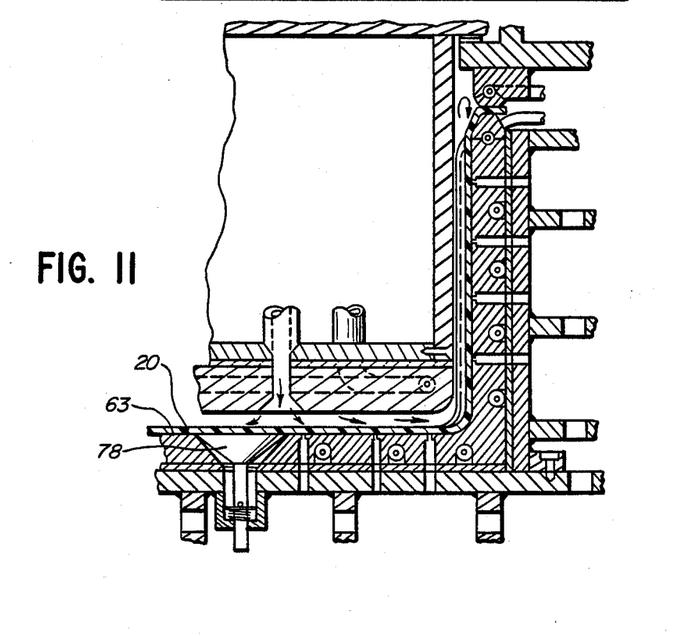
FIG. 11 is a fragmentary view generally similar to that of FIG. 10 and illustrating the expansion of the sheet against the female die effected by the provision of high pressure fluid through the male die member.

The construction of a suitable forming station is illustrated in greater detail in FIGS. 10 and 11. As seen in FIG. 10, the male die member 58 comprises a hollow member having a solid nose portion 69 fully insulated therefrom by the insulating layer 67. A heating conduit 73 is provided within the nose portion 69 for receiving a flow of heated oil from oil heater 49, for heating the nose portion to the desired temperature. The air passage 64 open downwardly from within the die member through the lower surface 74 of the die member to permit the high pressure form air to act directly against the upper surface 60 of the billet 20. As can be seen in FIG. 10, a clearance is provided between the male die member and the female die surface 63 in the fully inserted disposition of the male die member. Cooling fluid passages 75 are provided in the female die member for receiving a flow of cooling fluid, such as water, from the chiller 48. Vacuum passages 62 are shown to comprise small outwardly opening passages leading to a surrounding manifold 77. Air is removed from the underside of the billet as the male die member is moved downwardly into the female mold cavity through an outlet passage 76 controlled by a poppet valve 78. As can be seen in FIG. 11, when the high pressure air urges the billet 20 downwardly against the female die surface 63, it also urges the poppet valve 78 into the closed position.

Suitable hydraulic operators 79 are provided for selectively positioning the clamp ring 61, as shown.

Figure 13:
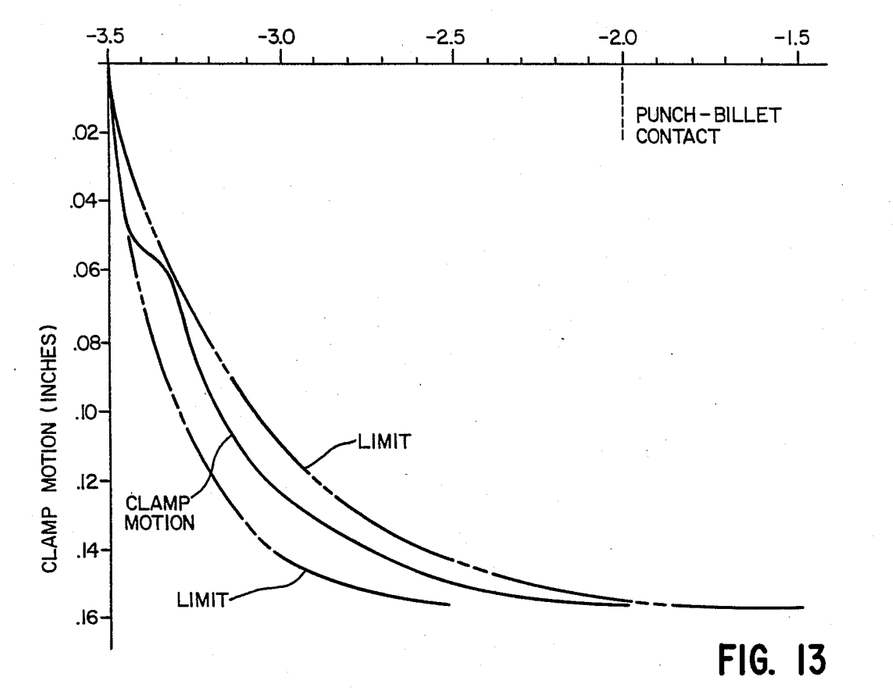
FIG. 13 is a graph illustrating the timed movement of the clamp in providing the improved clamping operation on the peripheral portion of the billet.

Referring to FIG. 13, the motion of the clamp ring in the progressive clamping of the peripheral portion of the billet is seen in greater detail. As shown, the clamp ring has a movement of approximately 0.16" over a period of 1½ seconds. Initially the clamp moves quite rapidly against the billet, but then decreases along a generally arcuate curve to the final clamping position. The illustrated progressive clamping has been found to provide an improved configuration of the liner sidewalls adjacent the liner flange, as discussed above and illustrated in FIG. 2C.

In the illustrated embodiment, the male die member is locked against upward movement at the time the high pressure air is introduced therethrough at the lowermost travel of the die member. Various conventional means may be provided for locking the male die member against upward movement by the force of the pressurized air.

The invention comprehends the provision of a low friction coating on the nose of the male die member and, in the illustrated embodiment, a coating of Teflon was provided thereon.

Manifold 77 communicates with a suitable source of pressure and vacuum through a suitable three-way valve (not shown). As will be obvious to those skilled in the art, provision of a vacuum through the passages 62 or the provision of pressurized air in removing the formed liner from the female die may be thusly readily effected.

By initially utilizing the stretch forming male die member to bring the billet to approximately the desired configuration and the utilizing the high pressure forming step in causing the billet to have accurate conformity with the female die surface, it has been found that an improved liner is produced having the desired thicknesses throughout the liner walls and avoiding the problems of the prior art solid phase forming techniques.

Not only does the produced liner have the desired indicated wall thicknesses, but warpage and distortion of the liner are effectively minimized. It is believed that the cooling of the heated billet slightly before carrying out the solid phase forming operation permits the surface of the billet to cool somewhat with respect to the core portion thereof. This has been found to increase the surface strength slightly and reduces the tendency of the surface to tear or fail during the stretch forming operation, thereby providing the improved facilitated forming method. It is contemplated within the broad scope of the invention that the differential heating of the upper surface may be effected by suitably controlling the heating temperatures and durations.

It should be noted that while the vacuum forming step affects only a portion of the total material movement accomplished by the total forming operation, the use of the vacuum step is important in achieving an acceptable finished product. The vacuum applied is relatively low, and a substantial portion of the forming process is effected by the stretch forming caused by movement of the male die member. As discussed above, it is believed that it is a combination of the vacuum forming, stretch forming and pressure forming steps which result in the optimum utilization of the present invention.

The male member may include projections tending to urge the sheet member toward recesses in the female die surface for further improved conformity of the billet to the female die surface. Such projections on a male die member are conventionally referred to as tuck bars and are conventionally retracted until the male die member reaches its lowermost position.

Figure 14:
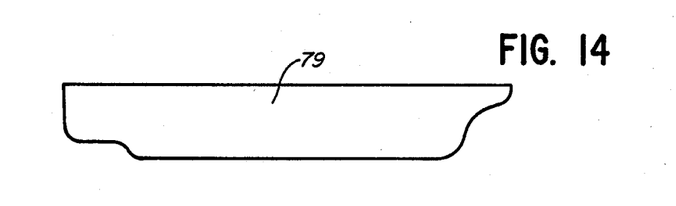
FIG. 14 is a side elevation of a modified male die member nose portion embodying the invention.
Figure 15:
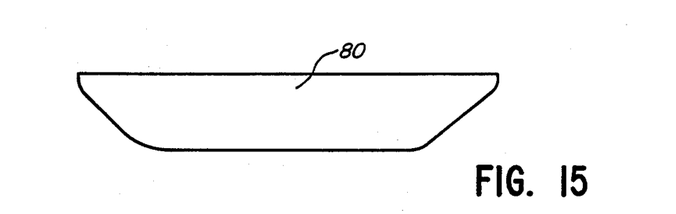
FIG. 15 is a side elevation of another modified male die member nose portion embodying the invention.

Referring now to FIGS. 14 and 15, several alternative configurations for the nose portion 69 of the male die member are illustrated. As indicated above, the nose portion need not have an accurate conformity with the female die surface 63. It has been found that a nose portion 79, as shown in FIG. 14, or a nose portion 80, as shown in FIG. 15, may provide an improved nontearing solid phase forming of the sheet material by providing a number of spaced radii rather than a single radius. Thus, by providing a plurality of arcuate surfaces about which the material bends rather than one single large arcuate surface, further improved uniformity in the distribution of the synthetic resin in the final product may be obtained.

The foregoing disclosure of specific embodiments is illustrative of the broad inventive concepts comprehended by the invention.

We claim:

1. The method of forming a large generally rectangular object, having overall dimensions of at least approximately 27"×60"×20", and a wall thickness of less then approximately 0.090", formed of polypropylene synthetic resin, comprising the steps of:
    cutting polypropylene sheet material into rectangular blanks, each blank having a maximum dimension which is perpendicular to the direction of the maximum molecular orientation of the sheet material, and a peripheral edge portion;
    heating one of said blanks to a temperature within the range of 315° F. to 328° F. to be subjacent the crystalline melting temperature thereof;
    allowing a first surface of the blank to cool;
    positioning the blank over a generally rectangular female die member;

clamping the peripheral edge portion of the blank to said female die member and progressively increasing the clamping force so as to cause a portion of the clamped material beneath said clamping means to flow inwardly toward the central portion of the blank;

creating a vacuum pressure within said female die member so as to vacuum form the blank to cause the central portion of the blank to move approximately one-half the distance into the female die member;

stretch forming the blank by contacting said first surface of the blank with a male die member and moving said male die member into said female die member;

terminating the inward motion of the male die member at a point prior to that at which the central portion of the blank contacts said female die member; and pressure forming the stretched blank against the surface of the female die member by applying positive air pressure through a nose portion of said male die member to complete the formation of said object.

2. The method of forming an object as claimed in claim 1 wherein the blank peripheral edge[, and further including portion defines a peripheral outturned flange of the formed object.

3. The method of forming an object as claimed in claim 1 wherein said vacuum forming and stretch forming are effected concurrently.

4. The method of forming an object as claimed in claim 1 wherein the material flowed inwardly toward the central portion of the blank defines a thickened wall portion of said object adjacent said peripheral edge.

5. The method of forming an object as claimed in claim 1 wherein said step of increasing the clamping force on the peripheral edge portion comprises controllably urging heated clamp means against said edge portion with a preselected progressively increasing force over a period of approximately 1½ seconds.

6. The method of forming an object as claimed in claim 5 further including a step of cooling said edge portion prior to initiating said stretch forming step.

7. The method of forming an object as claimed in claim 5 wherein the heated blank peripheral edge portion is cooled to a temperature lower than that of the blank inwardly of said peripheral edge portion prior to said solid phase forming step.

8. The method of forming an object as claimed in claim 1 wherein said object comprises a refrigeration apparatus cabinet liner and said step of clamping the edge portion comprises a step of urging clamp means against said edge portion to cause said edge portion to have a uniform thickness of approximately one-half the original sheet material thickness.

9. The method of forming an object as claimed in claim 1 wherein said clamping force is increased continuously just prior to the initiation of said vacuum forming step.

10. The method of forming an object as claimed in claim 1 wherein said object has a first portion and a second portion with selectively different impact resistance characteristics, said method further comprising the steps of forming said sheet material by extruding a continuous strip of said synthetic resin to have a maximum molecular orientation in a first direction, cutting the strip to form the blanks, and solid phase forming one of said blanks perpendicularly to the maximum molecular orientation in a first portion thereof defining said first portion of the object to provide a generally biaxial molecular orientation of the synthetic resin in said first portion of the object, and parallel to the molecular orientation thereof in a second portion thereof defining said second portion of the object to provide a generally uniaxial molecular orientation of the synthetic resin in said second portion of the object.

11. The method for forming an object as claimed in claim 10 wherein said object comprises a refrigeration apparatus cabinet liner and said first object portion comprises a bottom wall of the cabinet liner.

12. The method for forming an object as claimed in claim 10 wherein said object comprises a generally rectangular refrigeration apparatus cabinet liner, said first object portion comprises a bottom wall of the liner, and said second object portion comprises a sidewall of the cabinet liner.

13. The method of forming an object as claimed in claim 10 wherein said step of heating of the blank comprises a step of heating different portions of the blank to different temperatures.

14. The method of forming an object as claimed in claim 10 wherein said step of heating the blank comprises a step of heating a central portion, corners, and the edge portion of the blank to different preselected temperatures.

15. The method of forming an object as claimed in claim 1 wherein said first surface comprises the blank top surface.

16. The method of forming an object as claimed in claim 1 including a step of cooling said edge portion concurrently with the cooling of said first surface of the blank.

17. The method of forming an object as claimed in claim 1 wherein said step of heating the blank comprises a step of heating the blank in an oven, and said step of allowing said first surface to cool comprises a step of opening the oven for a preselected period of time to at least partially expose said surface prior to removing the heated blank from the oven for subsequent solid phase forming thereof.

18. The method of forming an object as claimed in claim 1 wherein the step of clamping the blank comprises a step of heating a clamp means to a preselected temperature below said crystalline melting temperature and controllably urging the heated clamp means against said edge portion with a preselected progressively increasing force.

19. The method of forming an object as claimed in claim 1 wherein said nose portion is stepped asymmetrically.

20. The method of forming an object as claimed in claim 1 wherein said nose portion is stepped symmetrically.

21. The method of forming an object as claimed in claim 1 wherein said blank is unsupported outwardly of said nose portion during the stretch forming thereof by said nose portion.

22. The method of forming object as claimed in claim 1 wherein said nose portion defines a plurality of successively smaller rectangular surfaces.

23. The method of forming an object as set forth in claim 1 wherein said blank has a preselected original thickness and the male and female die members have a clearance therebetween, the clearance between the male and female die members being greater than said original thickness of said blank.

24. The method of forming an object as claimed in claim 1 wherein said male die member has a nose portion defining an asymmetrical stepped surface having at least two spaced rounded edges.

* * * * *